Dec. 26, 1939.     H. BELAR     2,184,542
ACOUSTICAL MEASURING DEVICE
Filed Sept. 30, 1936
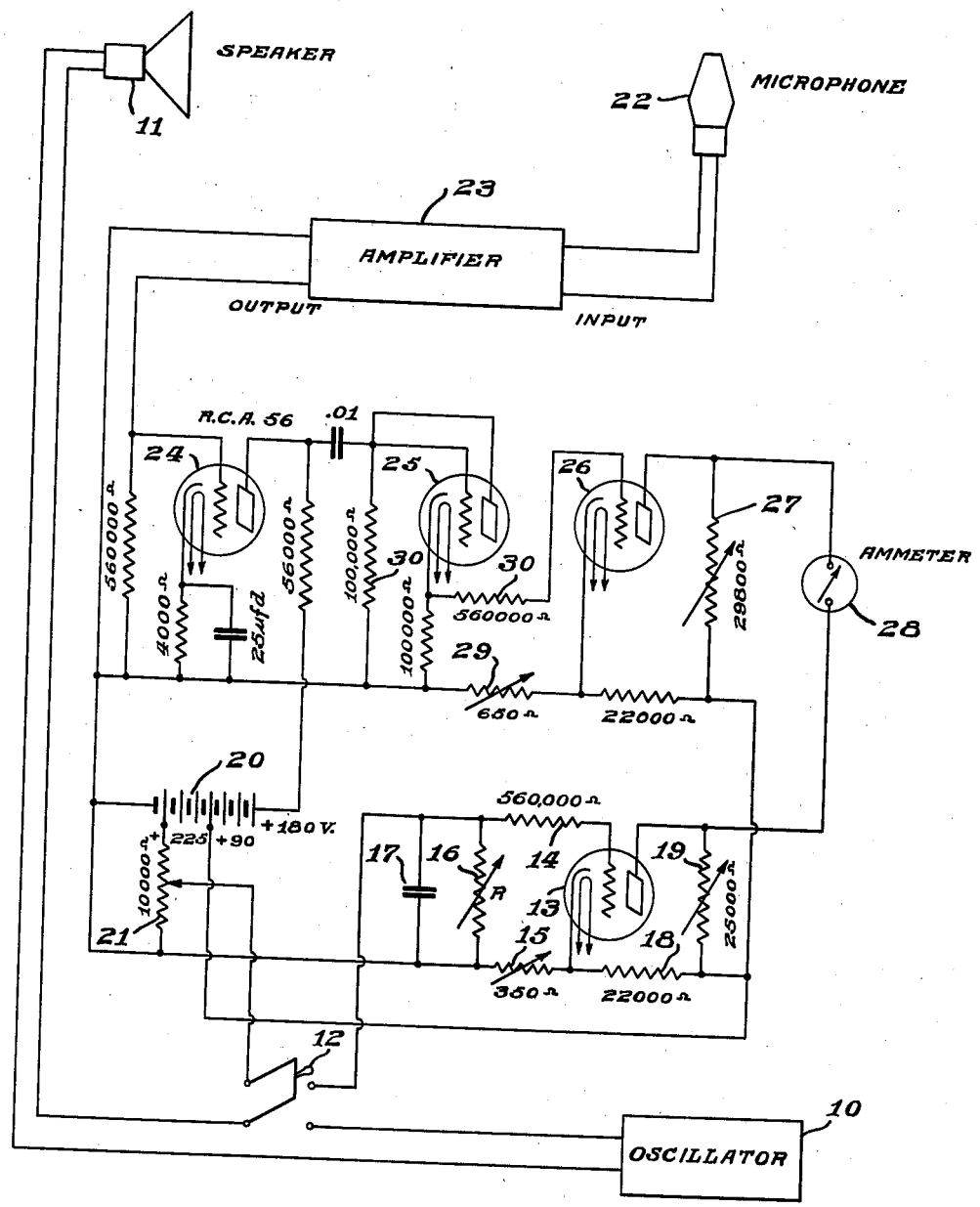
Inventor
Herbert Belar
By
Attorney Patented Dec. 26, 1939

2,184,542

UNITED STATES PATENT OFFICE 2,184,542

ACOUSTICAL MEASURING DEVICE

Herbert Belar, Philadelphia, Pa., assignor to Radio Corporation of America, a corporation of Delaware Application September 30, 1936, Serial No. 103,407

6 Claims. (Cl. 181—0.5)

This invention relates to acoustical measuring devices such as are utilized for measuring the reverberation time of a room, and has for its principal object the provision of an improved apparatus and method of operation whereby the rate of sound decay in a room may be more readily compared with a quantity which decays logarithmically.

The measuring device of the present invention is in some respects an improvement on the reverberation time bridge described by Olsen and Kreuzer in The Journal of the Acoustical Society of America, July 1930, Vol. II, No. 1, pages 78 to 82. This Olsen and Kreuzer device functions to compare the rate of sound decay with a quantity which varies logarithmically. In the operation of this device it has been found that the ratio between the compared quantities or currents is so great, especially in the lower value ranges, that it is difficult to secure an accurate indication of their resultant difference. In accordance with the present invention, this difficulty is avoided by the provision of means for producing an electrical current which varies or decays in accordance with the logarithm of the sound pressure in a room. Stated more specifically, the invention involves the use of a detector and amplifier, the output of which varies linearly with the logarithm of sound pressure and affords a more favorable basis of comparison with current which varies logarithmically and is converted to similarly vary linearly.

The invention will be better understood from the following description when considered in connection with the accompanying drawing, and its scope is indicated by the appended claims.

The single figure of the drawing is a wiring diagram of the improved reverberation measuring device.

This device includes an oscillation generator 10 arranged to be connected to a loud speaker 11 through one blade of a switch 12. The other blade of this switch completes the input circuit of a channel including an electron discharge device 13 provided with an input circuit including series resistors 14 and 15, shunt resistor 16 and capacitor 17. The output circuit of this device includes a resistor 18 and a resistor 19, the potential drop of which is to be used as a basis of measurement. Input and output voltages for operating the device 13 are derived from a source shown as a battery 20, the input potential being applied through the adjustable terminal of a resistor 21. This channel operates to produce in the resistor 19 a current which varies as the logarithm of the input current of the device 13. This results from the fact that the current of the resistor 16 varies exponentially with time, when the capacitor 17 is allowed to discharge through the resistor 16.

Sound produced by the loud speaker 11 is picked up by a microphone 22 and the resulting audio current is supplied through amplifiers 23 and 24, a detector 25, and an amplifier 26 to an output resistor 27, which is connected with the resistor 19 in a circuit including an indicator or measuring device 28. The loud speaker 11 and microphone 22 are located within the room which is to have its acoustical characteristics measured. The current of the resistor 27, like that of resistor 19, varies directly as the logarithm of the input current of the device 26.

The operation of the device includes closing and opening of the switch 12. When this switch is closed, the oscillator 10 feeds power of the desired frequency to the loud speaker 11. The sound pressure generated by the loud speaker is amplified by the amplifiers 23 and 24 in the form of the electrical energy output of the microphone. The output of the amplifier 24 is fed to the detector 25 which produces a direct current output voltage dependent on sound pressure. This direct current output is fed to the device 26, which is so adjusted by means of a resistor 29 that grid current is just about to start.

This adjustment may be determined by applying a signal to the input of the amplifier, measuring the output current of tube 26, with switch 12 open, and plotting the output current against the logarithm of the input voltage for various adjustments of the resistor 29. When the output current shows a linear relationship to the logarithm of the input voltage over the widest range, the resistor 29 is properly adjusted. At this adjustment it will be found that grid current definitely flows when an appreciable signal is applied, although without signal there is no appreciable grid current.

The resistor 15 is adjusted in a similar manner by applying a D. C. voltage to the terminals of the switch 12 which leads to the grid circuit of tube 13, and by again measuring the output current of the said tube and plotting it against the input voltage.

By reason of a large resistor 30 in series with the grid of the device 26, this input voltage produces in the plate circuit of the device 26 a current which is proportional to the logarithm of the input voltage, and since the logarithm of the input voltage varies with the decay of the sound, the logarithm of the input voltage and the plate current of the device 26 both vary linearly with time when the sound is stopped. At the same time, the device 13 draws current due to a positive potential being applied from the battery 20 across the resistor 15 by adjustment of the reversely connected resistors 19 and 27 and this current, due to the characteristics of the circuit, decreases linearly with time when the oscillator output is stopped. The output of the devices 13 and 26 are balanced. When the switch 12 is opened, the sound in the room decays logarithmically, thereby causing a decrease in current through the resistor 27 which is linear with time. Likewise, when the switch 12 is opened, the voltage across the capacitor 17 decreases logarithmically with time due to leakage through resistor 16, and due to the action of the tube 13, current through resistor 19 decreases linearly with time.

Since the meter 28 is connected between the plates of tubes 26 and 13, no current flows through it when the resistors 27 and 19 are so adjusted that the plate voltages of tubes 26 and 13 are the same. If one of the tubes draws more current than the other, the meter will show a deflection in a corresponding direction, but similar variations in both plate currents will not deflect the meter.

With the apparatus adjusted to equilibrium, as pointed out above, the switch 12 is opened and closed and resistor 16 is adjusted for minimum deflection of meter 28 during the period of decay of sound in the room. The reverberation time of the room then corresponds to the time constant of the circuit consisting of capacitor 17 and resistor 16, and may be mathematically determined from their values.

I claim as my invention:

1. An acoustical measuring device including a detector provided with an output circuit, means in said circuit for producing a current which varies linearly with the logarithm of sound pressure, means for producing a current which varies linearly with time, and means operatively connected to said last means and said circuit for balancing said currents one against the other.

2. An acoustical measuring device including a detector provided with an output circuit, means comprising a resistor connected in said circuit for producing a current which varies linearly with the logarithm of sound pressure, means for producing a current which varies linearly with time, and means operatively connected to said last means and said circuit for balancing said currents one against the other.

3. An acoustical measuring device including a detector provided with an output circuit, means in said circuit for producing a current which varies linearly with the logarithm of sound pressure, means for producing a current which varies linearly with time, means for balancing said currents one against the other, and means operatively connected to said last means and said circuit for indicating the resultant of said currents.

4. An acoustical measuring instrument including a plurality of channels each provided with an input and an output circuit, means in one of said input circuits for introducing into said input circuit a current which varies linearly with sound pressure, means in another of said input circuits for introducing into said other input circuit a current which varies logarithmically with time, means for producing in said output circuits currents which vary directly as the logarithm of their corresponding input currents, and means connecting said output circuits for indicating the resultant difference of said output currents.

5. An acoustical measuring instrument including a plurality of channels each provided with an input and an output circuit, means in one of said input circuits for introducing into said input circuit a current which varies linearly with sound pressure, means in another of said input circuits for introducing into said other input circuit a current which varies logarithmically with time, means for producing in said output circuits currents which vary exponentially with their corresponding input currents, and means connecting said output circuits for indicating the resultant difference of said output currents.

6. An acoustical measuring device including a detector provided with an output circuit, means in said circuit for producing a current which varies linearly with the logarithm of sound pressure and which, therefore, varies linearly with time on the cessation of sound input, means for producing a current which varies linearly with time on the cessation of an input independent of sound, means for simultaneously cutting off both of said inputs, means operatively connected to said current producing means and said circuit for balancing said currents one against the other, and means for indicating the resultant of said currents.

HERBERT BELAR.